J. BROZEK.
DETACHABLE TURRET FOR DRILL PRESSES AND THE LIKE.
APPLICATION FILED JUNE 11, 1912.
1,079,973.
Patented Dec. 2, 1913.
2 SHEETS—SHEET 2.
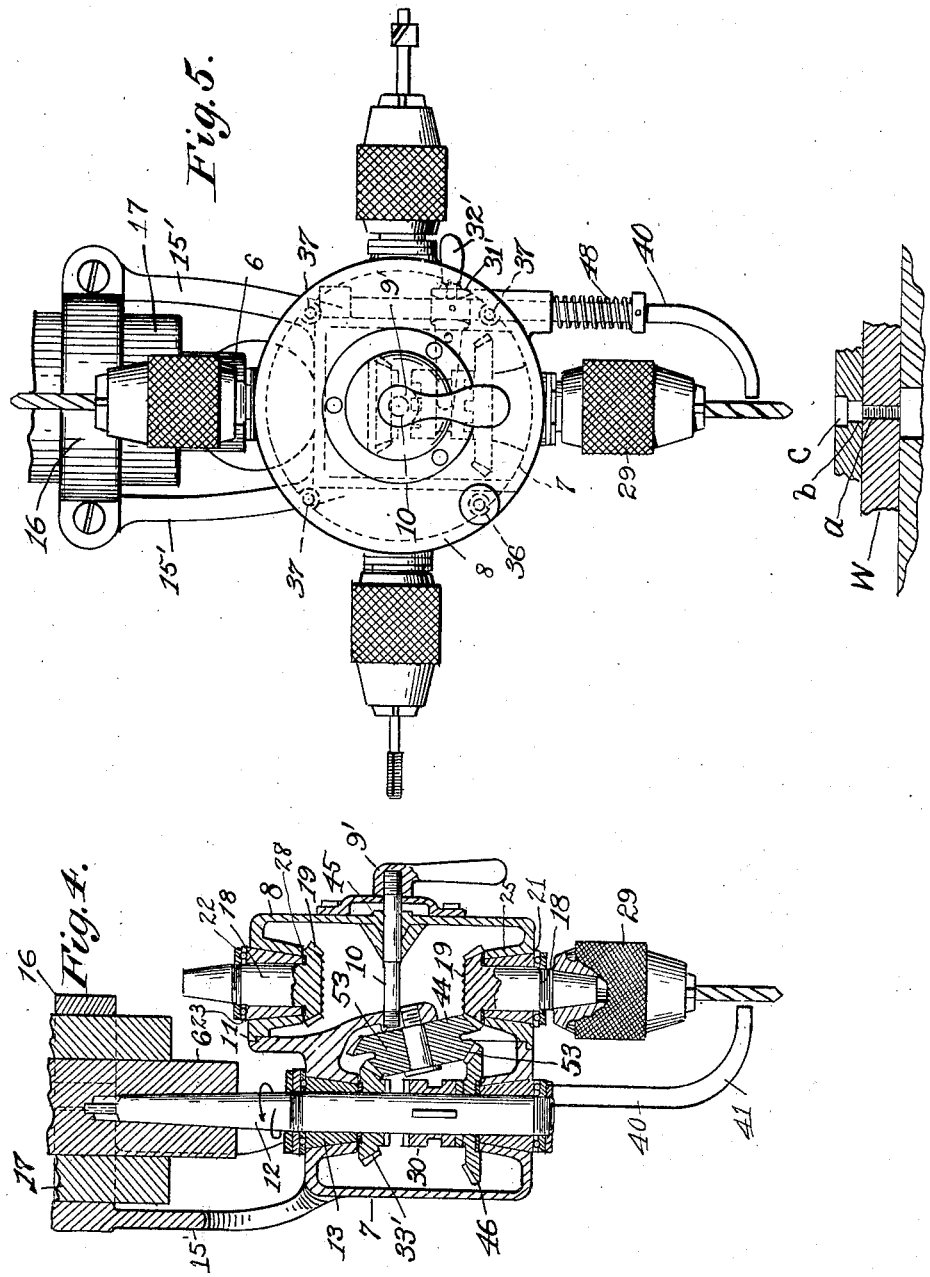

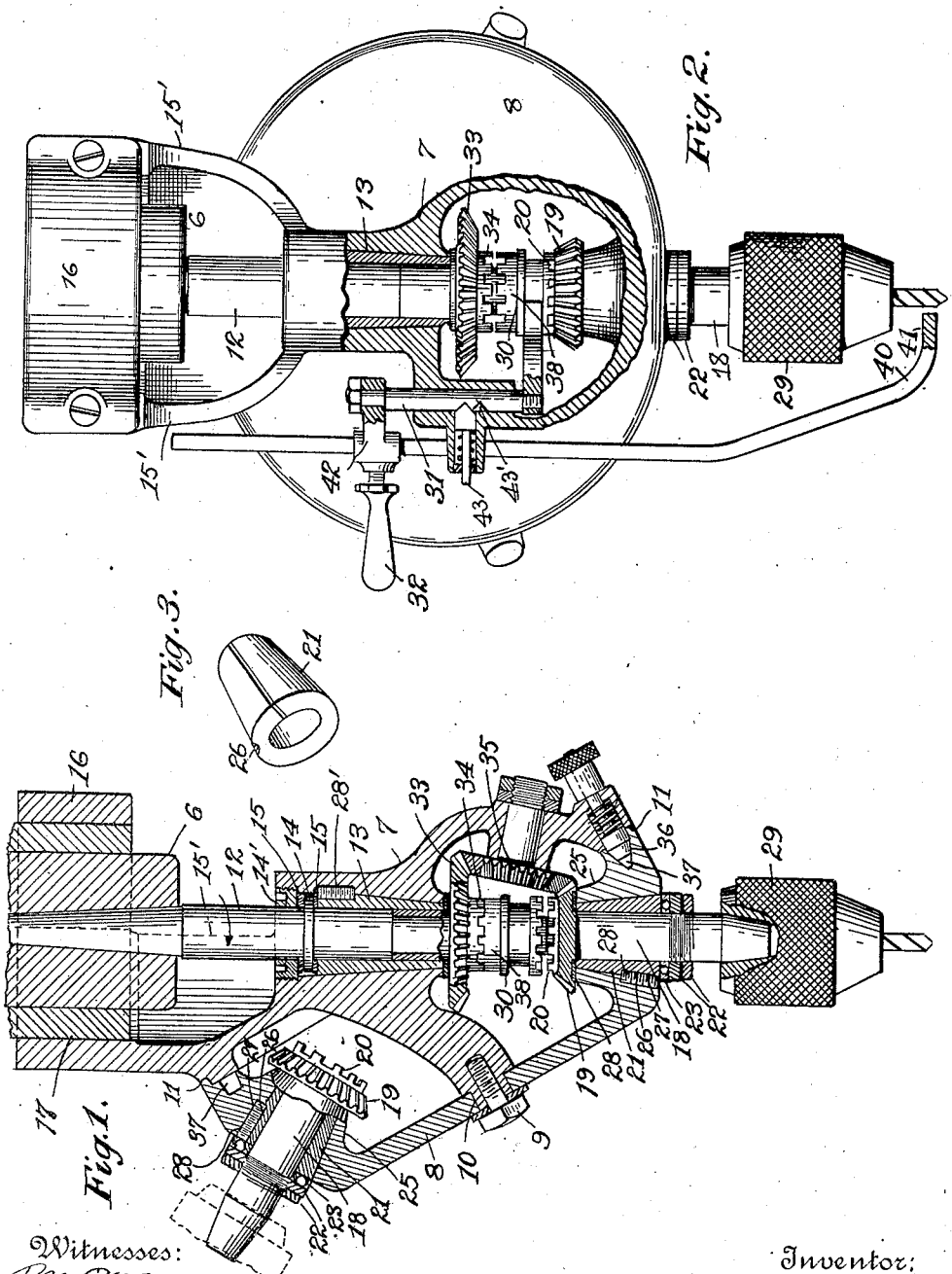

UNITED STATES PATENT OFFICE.

JOSEPH BROZEK, OF NEW YORK, N. Y.

DETACHABLE TURRET FOR DRILL-PRESSES AND THE LIKE.

1,079,973.     Specification of Letters Patent.     Patented Dec. 2, 1913.

Application filed June 11, 1912. Serial No. 703,009.

*To all whom it may concern:*

Be it known that I, JOSEPH BROZEK, a citizen of the United States, residing in the borough of Queens, in the county of Queens, city and State of New York, have invented new and useful Improvements in Detachable Turrets for Drill-Presses and the like, of which the following is a specification.

This invention relates to turret mechanism to be detachably connected to a rotatable spindle or shaft, such as the spindle of a drill press, lathe or the like, and it is the object of the invention to provide a device of this character adapted to carry a number of tools, each of which may be brought at will into operative position, and to provide a device that is simple and cheap in construction and efficient in operation.

A further object of the invention relates to means to impart reverse motion to the tools without changing the direction of motion of the driving spindle for the purpose of backing off the tools, and to means to automatically cause reverse motion to be imparted to the tools when a tool has descended a predetermined distance.

Further objects and advantages will hereinafter appear.

In the drawings accompanying and forming a part of this specification, Figure 1 is a sectional side elevation of a turret embodying my invention. Fig. 2 is a view, partly in section, looking at the left of Fig. 1. Fig. 3 is a perspective view of a bushing in which the tool spindles are mounted in the turret. Fig. 4 is a sectional side elevation of a modified form of turret mechanism; and Fig. 5 is a view looking at the left of Fig. 4.

Similar characters of reference designate like parts throughout the different views of the drawings.

In the embodiment of my invention illustrated in the drawings I have shown the same as detachably applied to the spindle 6 of a drill press, although it is also applicable to a spindle rotatable on a horizontal axis, such as the spindle of a lathe or the like. The turret comprises a pair of separable members, one member as 7, stationary and the other member 8 rotatably supported on the shouldered end of a stud 10 projecting centrally from the member 7 and retained thereon by a screw 9. The stationary member also has an annular seat 11 in which the rotatable member engages. Rotatably mounted in a bushing 13 in the member 7 is a driving spindle 12 adapted to engage in the socket of the spindle 6, said spindle 12 having an annular flange 14 engaging between a pair of washers 15, preferably of fiber, engaging in the spindle opening in the member 7, the washer abutting against the end of the bushing 13 and the spindle prevented from having axial upward movement by a nut 14' screw threaded into the spindle opening.

To securely fix the turret in position and prevent rotary movement thereof with the driving spindle, the member 7 is provided with bracket arms 15' connected by a transverse connecting bar 16 semi-circular in form to embrace the sliding sleeve 17 by means of which the drill spindle is raised and lowered, a complementary member engaging at the opposite side of the sleeve 17 and secured to the bracket arms 15' by screws to clamp the turret firmly in place and whereby it will reciprocate with the drill spindle.

The rotatable member of the turret 8 carries a series of tool spindles 18, either of which is adapted to be placed in coaxial alinement with the driving spindle 12 to drive it direct therefrom and locked in such position by a spring influenced locking pin or detent 36 carried by the stationary member 7 engaging in either one of a series of register apertures 37 in the rotatable member 8. Each of the tool spindles has a beveled pinion 19 fixed to the inner end thereof and so constructed as to constitute one member of a clutch, as at 20. The tool spindles are mounted in adjustable bushings 21 and maintained therein by locking nuts 22, a thrust bearing 23 being interposed between the nuts and material of the member 8; a fiber washer 28 is also interposed between the pinions and a boss 25 to prevent undue chattering or noise, said washer preferably being seated in a recess in the pinions. To permit of adjustment of the bushings 21 to take them up for wear, etc., they are made tapering and split lengthwise, as shown in Fig. 3, and the openings in the member 8 in which they engage are correspondingly tapered. The bushings have a section of screw threads 26 corresponding to another section of screw threads 27 in the member 8, a set screw 28 engaging with said threads, and to take up the bushing it is only necessary to screw in said screw when the bushing will be drawn into its opening in the member 8 and thereby drawn together to firmly engage with the tool spindle. The bushing 17 is similarly adjustable by a set screw 28'.

The driving spindle 12 is constantly rotated in the direction of the arrow, and the tool spindles when carrying a tool, as by a chuck 29 to drill or tap a hole, are rotated in the same direction as the driving spindle 12. For this purpose I mount on the driving spindle to rotate therewith and have sliding movement thereon a clutch member 30 adapted to be operatively connected to either one of the tool spindle clutch members 20. A shifter lever 31 having a handle 32 is slidably mounted in the turret member 7 and has a fork to engage in an annular recess in the clutch member 30, said shifter operable to throw the clutch member 30 into and out of engagement with a tool spindle clutch member 20.

When screw threading or tapping holes it is essential that the tool has a reverse motion imparted thereto in order to "back off" the tap. For this purpose I rotatably mount on the driving spindle 12 a pinion 33 having a sleeve portion engaging in the bushing to prevent canting or lateral movement of the pinion, said pinion also constructed to form one member of a clutch 34, an idler pinion 35 rotatably supported by the turret member 7 connecting the pinion 33 with the tool spindle pinions 19. When a hole has been tapped, the clutch member 30 being operatively connected with a tool spindle clutch member and driving the tool spindle direct from the driving spindle 12, and it is desired to back off the tap it is only necessary to raise the shifter 31 when the clutch member 30 will be thrown out of engagement with the tool spindle and a complementary clutch face 38 on the clutch member 30 will be thrown into operative engagement with the clutch of the pinion 33 connecting the pinion to the driving shaft and reversing the rotation of the tool spindle through the intermediate idler 35.

To automatically reverse the motion of a tool, such as a tap, when it has descended or entered a predetermined distance in a hole, I provide a gage 40, said gage being in the form of a rod with the end bent substantially at a right angle, as at 41, and adjustably carried by the shifter to ascend and descend with the tool spindle and turret. For this purpose I provide the shifter with an arm 42 having an opening through which the gage passes, and to lock it therein, the handle 32 is screw threaded into said arm with the end abutting against the gage. In operation the gage is set at a distance from the end of the tool the depth of the hole and secured in position by the handle 32. As the tool descends and approaches the bottom of the hole, the offset portion 41 of the gage will engage the work, and the further descent of the turret with the gage will raise the latter and thereby the shifter throwing the clutch member 30 out of engagement with the tool clutch 20 and into engagement with the pinion clutch 33 connecting the tool to the driving spindle 12 through the train of gearing 33, 35, 19, and reversing the motion thereof.

After a hole has been drilled or tapped and it is desired to adjust the turret for the operation of another tool, it is only necessary to withdraw the locking pin 36 when the turret member 8 is rotated on its axis, which is at any suitable angle to the axis of the driving spindle so that as the turret is rotated a tool will come in coaxial alinement with the driving spindle, the tool pinion 19 is automatically thrown into mesh with the idler 35, when the clutch member 30 is thrown by the shifter into engagement with the clutch member of the tool spindle and the operation is repeated. The ratio of the gearing 33, 35, 19 is such as to materially increase the speed of the tool spindles relative to the driving spindle.

The clutch shifter is maintained in its adjusted positions by a spring detent 43 carried by the turret member 7 engaging in either one of two recesses 43' in the shifter 31; that is, when the clutch member 30 is in engagement with the tooth pinion clutch 20, the detent 43 will engage in the lower detent opening 43' and maintain said clutch members in engagement, and the detent 43 will engage in the upper detent opening 43' when the clutch member 30 and pinion clutch 34 are in engagement.

In the construction shown in Figs. 4 and 5, the axis of rotation of the turret member 8 is at right angles to the driving spindle, whereby the tool although operating on an axis parallel with the driving spindle is offset from the latter. The turret 8 also has a cone bearing, as at 45, with its supporting stud 10 to give it stability, and is removably connected to the turret member 7 by a handle 9'. In said construction the tool is driven in the same direction as the driving spindle 12 through a pinion 33' rotatably mounted on the spindle 12, connected thereto by the clutch member 30, meshing with one, 53, of a pair of connected intermediate bevel pinions, the other, as 44, of which meshes with either one of the tool pinions 19. To reverse the motion of a tool a second pinion 46, also constructed to form one member of a clutch is rotatably mounted in the turret member 7 on the spindle 12 and connected to the latter through the clutch member 30. The clutch 30 is thrown into and out of operative connection with either of the pinions 33' or 46 by a shifter 31' having a handle 32' pivotally supported on the turret member 7. The motion of a tool is automatically reversed when a tool has entered a predetermined distance in a hole by a gage 40 similar to the gage shown in Figs. 1 and 2, a spring 48 acting through said gage normally maintaining the clutch member in operative engagement with the pinion 33'. In the present instance I have shown the turret as provided with a series of four tool spindles to carry four tools and thereby perform four operations on a piece of work, as shown at W in Fig. 5; that is, drilling a hole a, forming a body portion as at b by the succeeding tool, counterboring said hole, as at c, by the succeeding tool, and then screw threading or tapping the hole a.

Variations may be resorted to within the scope of my claims and portions of the improvements may be used without others.

Having thus described my invention, I claim:

1. A detachable turret mechanism for drill presses and the like, comprising in combination a turret head; a support upon which the turret is rotatably mounted and whereby it is adapted to be detachably connected to a drill press; rotatable tool spindles carried by the turret; a combined pinion and clutch member fixed to each of said spindles; a driving spindle rotatably mounted in the turret support and by means of which the turret is operatively connected to the spindle of the drill press; a combined pinion and clutch member rotatably mounted on the driving spindle; an idler pinion at all times in mesh with the pinion on the driving spindle and with which either one of the tool spindle pinions are adapted to mesh; a duplex clutch member mounted on the driving spindle to rotate therewith and have sliding movement thereon and adapted to be thrown into operative engagement with either one of the tool spindle clutch members to rotate said spindle in the same direction as and directly from the driving spindle, or to be thrown out of engagement with a tool spindle clutch member and into engagement with the pinion clutch member on the driving spindle and cause the tool spindle to rotate in a reverse direction through the idler pinion, substantially as and for the purpose specified.

2. A turret mechanism for drill presses and the like, comprising in combination a turret head; a support upon which the turret is rotatably mounted having means to detachably connect it to a drill press; rotatable tool spindles carried by the turret; a bevel pinion fixed to each of said tool spindles and constructed to constitute one member of a jaw clutch; a driving spindle rotatably mounted in the turret support adapted to be operatively connected to the spindle of a drill press; a bevel pinion rotatably mounted on said spindle and also constructed to constitute one member of a jaw clutch; an idle bevel pinion at all times in mesh with the driving-spindle pinion and with which either one of the tool spindle pinions are adapted to mesh; and a duplex clutch member on the driving spindle to rotate therewith and having sliding movement thereon operable to connect a tool spindle directly to the driving spindle to drive the former directly from the latter and in the same direction, or to connect the tool spindles with the driving spindle through the idle pinion to drive the tool spindle in a reverse direction, substantially as and for the purpose specified.

3. A detachable turret mechanism for drill presses and the like, comprising in combination a turret head; a support upon which the turret is rotatably mounted and having means to detachably connect it to the drill press; rotatable tool spindles carried by the rotatable member; adjustable bearings in which said spindles are mounted; a pinion fixed to each of said spindles and constituting one member of a clutch; a driving spindle rotatably mounted in the turret support and adapted to be connected to the driving spindle of the drill press; a pinion rotatably mounted on the driving spindle and constituting one member of a clutch; an idler pinion meshing with the driving spindle pinion and with which either one of the tool spindle pinions is adapted to mesh; a duplex clutch member mounted on the driving spindle to rotate therewith and have sliding movement thereon; and a shifter connected to said clutch member to operatively connect it with either one of the tool spindle clutch members and thereby drive the tool spindles directly from and in the same direction as the driving spindle, or to connect it with the driving spindle pinion to drive the tool spindles through the gear train in a direction reverse to the driving spindle, said shifter comprising a yoke to engage in an annular recess in the duplex clutch member, a rod connected to the yoke and mounted in the turret support to have longitudinal sliding movement, a handle connected to the rod, and a detent adapted to engage with either one of a pair of recesses in the rod to lock the clutch in its adjusted position.

4. A detachable turret mechanism for drill presses and the like, comprising in combination a turret head; a support upon which the turret is rotatably mounted and having means to detachably connect it to the drill press; rotatable tool spindles carried by the turret; a bevel pinion fixed to each of said spindles and constituting one member of a clutch; a driving spindle rotatably mounted in the turret support and adapted to be connected to the driving spindle of a drill press; a bevel pinion rotatably mounted on the driving spindle and constituting one member of a clutch; an idler bevel pinion meshing at all times with the driving spindle pinion and with which either one of the tool spindle pinions is adapted to mesh; a duplex clutch member mounted on the driving spindle to rotate therewith and have sliding movement thereon; a shifter connected to said clutch member to operatively connect it with either one of the tool spindle clutch members to drive the tool spindles directly from and in the same direction as the driving spindle; and a gage bar adjustably connected to the shifter to throw said clutch member out of engagement with a tool spindle clutch member and into operative engagement with the driving spindle pinion clutch to rotate the tool spindles through the idle pinion in reverse direction, when the driving spindle of the press with the turret has been lowered a predetermined distance.

5. In a device of the class specified, the combination of a driving spindle adapted to be connected to the spindle of a drill press; turret mechanism comprising two separable members, one member stationary in which said driving spindle is rotatably mounted and having means to detachably connect it to a drill press, and the other adjustably carried by the stationary member; a spring detent carried by the stationary member adapted to engage in either one of a series of openings in the adjustable member to lock the latter in adjusted positions; tool spindles rotatably carried by the rotatable member; a bevel pinion connected to each of the tool spindles; a pair of bevel pinions rotatably mounted on the driving spindle and each constituting one member of a clutch; an idler pinion meshing with said latter pinion; a second idler pinion connected to and rotatable with the first idler pinion and with which either one of the tool spindle pinions is thrown into operative relation as the rotatable member of the turret is adjusted; and a clutch member mounted on the driving spindle to rotate therewith and have sliding movement thereon whereby to connect either one of the pinions on the driving spindle to the driving spindle to rotate the tool spindles in either direction.

6. In a device of the class specified, the combination of a driving spindle adapted to be connected to the spindle of a drill press; turret mechanism comprising two separable members, one member stationary in which said driving spindle is rotatably mounted and having means to detachably connect it to the drill press, and the other member adjustably carried by the stationary member; a spring detent carried by the stationary member and adapted to engage in either one of a series of openings in the adjustable member to lock the latter in adjusted positions; tool spindles rotatably carried by said rotatable member; bevel pinions connected to said tool spindles; a pair of bevel pinions rotatably mounted on the driving spindle and each constructed to form one member of a clutch; an idler pinion meshing with the tool spindle pinions; a second pinion connected to and rotatable with the idler pinion and with which either one of the tool spindle pinions is thrown into mesh as the rotatable turret member is adjusted; a duplex clutch member mounted on the driving spindle to rotate therewith and have sliding movement thereon; and a shifter connected to said clutch member to throw it into engagement with one of the driving-spindle pinion-clutches to rotate the tool spindles in one direction, and into engagement with the other driving-spindle pinion-clutches to drive the tool spindles in a reverse direction.

JOSEPH BROZEK.

Witnesses:
 PERCY A. SMITH,
 JOSEPH J. HOLUB, Jr.